United States Patent
Bahadur et al.

(10) Patent No.: US 6,706,779 B2
(45) Date of Patent: Mar. 16, 2004

(54) RADIATION CURABLE COMPOSITIONS CONTAINING ALKENYL ETHER FUNCTIONAL POLYISOBUTYLENES

(75) Inventors: Maneesh Bahadur, Midland, MI (US); Susan Victoria Perz, Essexville, MI (US); Toshio Suzuki, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 30 days.

(21) Appl. No.: 09/940,153

(22) Filed: Aug. 27, 2001

(65) Prior Publication Data

US 2002/0028303 A1 Mar. 7, 2002

Related U.S. Application Data

(63) Continuation-in-part of application No. 09/569,283, filed on May 12, 2000.

(51) Int. Cl.$^7$ .................................................. C08F 2/48
(52) U.S. Cl. .............................. 522/99; 522/25; 522/15; 522/17; 522/18; 522/148; 522/172; 427/508; 427/513; 427/515; 427/487; 427/489; 427/496
(58) Field of Search ............................. 522/25, 15, 17, 522/18, 99, 148, 172; 427/508, 513, 515, 487, 489, 496

(56) References Cited

U.S. PATENT DOCUMENTS

| | | | |
|---|---|---|---|
| 4,617,238 A | 10/1986 | Crivello et al. | ............ 428/452 |
| 4,808,664 A | 2/1989 | Saam | ......................... 525/106 |
| 5,270,423 A | 12/1993 | Brown et al. | ................. 528/15 |
| 5,594,042 A | 1/1997 | Glover et al. | ................. 522/31 |
| 5,629,095 A | 5/1997 | Bujanowski et al. | ....... 428/447 |
| 5,665,823 A | 9/1997 | Saxena et al. | ............. 525/106 |
| 5,973,020 A | 10/1999 | Kerr, III et al. | ............. 522/25 |
| 6,054,549 A | 4/2000 | Bahadur et al. | ............. 528/29 |
| 6,069,185 A | * | 5/2000 | Bahadur et al. ............. 522/25 |

FOREIGN PATENT DOCUMENTS

| | | | |
|---|---|---|---|
| EP | 462389 | 12/1991 | .......... C08G/77/14 |
| EP | 562922 | 9/1993 | .......... C08G/77/04 |
| EP | 1004605 A1 | 5/2000 | ......... C08F/290/04 |
| WO | WO 91/04992 | 4/1991 | ............. C08F/8/00 |
| WO | WO 92/11295 | 7/1992 | ............. C08F/2/54 |

OTHER PUBLICATIONS

U.S. patent application Ser. No. 09/569,283, Bahadur et al., filed May 12, 2000.
Polymer Bulletin, by J.P. Kennedy, Sandor Nemes & Tibor Pernecker, published 1991, V. 25, pp. 633–640.
Radtech North America Proceedings, by N.A. Merrill, I.J. Gardner & V.L. Hughes, published 1992, V. 1, pp 77–85.
Polymer Coatings for Optical Fibers, CHEMTECH, by Blyler & Aloisio, published Nov. 1987, pp. 680–684.
Angewandte Chem. Int. Ed. Engl. 30, by Hitchcock et al., published 1991, pp. 438–440.
Polymer Bulletin, by T.P. Liao and J.P. Kennedy, published 1981, V. 6, pp. 135–141.
Journal of Polymer Science, Part A, Polymer Chemistry, by J.P. Kennedy & B. Ivan, published 1990, V. 28, p. 89.

* cited by examiner

*Primary Examiner*—James J. Seidleck
*Assistant Examiner*—Sanza L. McClendon
(74) *Attorney, Agent, or Firm*—Larry A. Milco

(57) ABSTRACT

This invention relates to radiation curable compositions comprising an alkenyl ether functional polyisobutylene, a cationic photoinitiator, and a miscible reactive diluent selected from specified organic vinyl ether compounds, epoxy functional compounds, or compounds having the formula $R^8X_b$, wherein $R^8$ is a non-silicon containing organic group, X is an organic group containing at-least one acrylate functional group, and b has a value of 1-3. The radiation curable compositions exhibit a low cure energy, have a high moisture vapor barrier, high damping characteristics, and a high refractive index, and provide a barrier to corrosive vapors and have maintained or enhanced modulus, tensile strength, and toughness.

24 Claims, No Drawings

RADIATION CURABLE COMPOSITIONS CONTAINING ALKENYL ETHER FUNCTIONAL POLYISOBUTYLENES

This application is a continuation in part of U.S. patent application serial No. 09/569,283, filed May 12, 2000.

FIELD OF THE INVENTION

This invention relates to radiation curable compositions. More particularly, this invention relates to radiation curable compositions comprising an alkenyl ether functional polyisobutylene, a cationic photoinitiator and a miscible reactive diluent. This invention can further comprise of optional ingredients such as free radical photoinitiator, photosensitizers, non-reactive diluents, thermo-oxidative stabilizers, adhesion promoters, and shelf life stabilizers.

BACKGROUND OF THE INVENTION

Polyisobutylenes containing functional groups which are radiation curable have been disclosed in the art. For example, T. P. Liao and J. P. Kennedy in *Polymer Bulletin*, V. 6, pp. 135–141 (1981) disclose acryl and methacryl telechelic polyisobutylenes having the formula $CH_2=C(R)-COO-PIB-OOC-C(R)=CH_2$ where R is —H or $CH_3$. These materials were prepared by reacting alpha, omega di-hydroxypolyisobutylene, $HOCH_2-PIB-CH_2OH$, and excess acryloyl or methacryloyl chloride. These prepolymers are disclosed as being useful in the synthesis of a variety of new composites containing a soft polyisobutylene segment.

J. P. Kennedy and B. Ivan in *Polymer Material Science and Engineering*, V. 58, p. 866 (1988) disclose allyl telechelic linear and star-branched polyisobutylenes prepared by a convenient rapid one pot polymerization functionalization process. The polymerization step involved living polymerization of isobutylene by recently discovered mono- or multifunctional initiating systems (combinations of tert.-ester and ether/Lewis acids) followed by electrophilic functionalizations by allyl trimethylsilane in the presence of TiCl4. Characterization indicated quantitative end allylations. Subsequent quantitative derivations of the allyl termini yielded mono-, di-, and tri-functional hydroxyl- and epoxy-telechelic polyisobutylenes which could be cured to rubbery networks.

J. P. Kennedy and B. Ivan in the *Journal of Polymer Science, Part A, Polymer Chemistry*, V. 28, p. 89 (1990) disclose mono-, di-ended linear, and three-arm star allyl telechelic polyisobutylenes which are prepared by a rapid economical one-pot polymerization-functionalization process. The process involved the living polymerization of isobutylene by mono-, di-, or tri-functional initiating systems, specifically by aliphatic and aromatic tert-ester and -ether/TiCl$_4$ combinations, followed by electrophilic functionalization of the living sites with allyl-trimethylsilane. Quantitative derivations of the ally termini yielded mono-, di-, and tri-epoxy and -hydroxy-telechelic polyisobutylenes. It is further disclosed that strong rubbery networks were made by curing the epoxy-telechelic polyisobutylenes with triethylene tetramine and by reacting the hydroxy-telechelic polyisobutylenes with MDI.

J. P. Kennedy, Sandor Nemes and Tibor Pernecker in *Polymer Bulletin*, V. 25, p. 633 (1991) disclose vinyl ether headed polyisobutylenes macromonomers. However no mention was made regarding radiation curable compositions based on these macromonomers. It is known that radiation cured networks from non-telechelic macromonomers will posses poor physical properties.

N. A. Merrill, I. J. Gardner, and V. L. Hughes in RadTech North America Proceedings, V. 1, pp. 77–85 (1992) disclose conjugated diene functional polyisobutylenes which have a high reactivity to both ultraviolet and electron beam radiation. These conjugated diene functional polyisobutylenes, alone or in a formulation, are disclosed as being useful in preparing pressure sensitive adhesives.

In PCT Patent Publication No. WO 9104992 is disclosed a functionalized copolymer of isobutylene and a para-methylstyrene, wherein at least one type of functional group is attached to the para-methyl group of the para-methylstyrene, the copolymer having a substantially homogenous compositional distribution. The functionalized groups are exemplified by alkoxides, phenoxides, carboxylates, thiolates, thiopenolates, thioethers, thiocarboxylates, dithiocarboxylates, thioureas, dithiocarbamates, xanthanates, thiocyanates, silanes, halosilanes, malonates, cyanides, amides, amines, carbazoles, phthalimides, pyridine, maleimide, cyanates, and phosphines.

In PCT Patent Publication No. WO 9211295 is disclosed a radiation reactive functionalized polymer comprising an isoolefin having about 4 to about 7 carbon atoms and a para-alkylstyrene, wherein a radiation reactive functional group is attached to the para-alkyl group of the para-alkylstyrene, and discloses radiation curable pressure sensitive adhesives comprising the functionalized polymer and a tackifier. In WO'295, the radiation curable groups are disclosed as being groups such as thioxanthones, acrylates, aldehydes, ketones, and esters.

Saxena et al. in U.S. Pat. No. 5,665,823 disclose a method for preparing an acrylic functional polyisobutylene polymer or copolymer, the method comprising reacting a polyisobutylene polymer or copolymer which contains at least one carbon-bonded silanol group in it molecule with a silane having both an acrylic-containing group and a silicon-bonded hydrolyzable group in its molecule.

Furthermore, radiation curable compositions which contain vinyl ether functional organosilicon compounds have also been described in the art. For example, Crivello in U.S. Pat. No. 4,617,238 discloses a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroradical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

European Patent Publication No. 0462389teaches themosetting organopolysiloxanes with oxyalkylene vinyl ether groups bonded by SiOC groups and the vinyl groups may be substituted by alkyl groups. EPO'389 also teaches a method for the preparation of these compounds and their application as photochemically thermosetting polysiloxanes in encapsulating compounds, as non-stick coating compounds for flat carriers or as modified additives in compounds which can be thermoset radically, cationically or by UV or electron radiation.

Brown et al., in U.S. Pat. No. 5,270,423 disclose organosilicon compounds with a siloxane portion of the general formula —OR'OCH=CHR" linked via an SiOC bond wherein R' is a divalent hydrocarbon group and R" is hydrogen or an alkyl group which are useful in radiation curable compositions, in which they are mixed with an initiator. The compositions are particularly useful in UV radiation curable coatings.

Glover et al. in U.S. Patent No. 5,594,042 discloses radiation curable compositions comprising vinyl ether functional siloxanes and aromatic iodonium salt or aromatic sulfonium salt photoinitiators which cure upon exposure to ultraviolet or electron beam radiation. The vinyl ether groups are linked to the silicon atom on the siloxane through an SiOC bond and the photoinitiators are disclosed as being preferably either diaryliodonium salts of sulfonic acids or triarylsulfonium salts of sulfonic acids.

Bujanowski et al. in U.S. Pat. No. 5,629,095 disclose vinyl ether functional siloxane resins, radiation curable coating compositions comprising a vinyl ether functional siloxane resin and a photocleavable acid, and a coated article obtained by applying the radiation curable coating composition to a substrate and then exposing the coating to radiation in an amount sufficient to cure the coating. In the '095 patent, the vinyl ether group in the siloxane resin is attached to the silicone atom through an SiOC bond.

SUMMARY OF THE INVENTION

The present invention relates to radiation curable compositions comprising an alkenyl ether functional polyisobutylene, a cationic photoinitiator and a miscible reactive diluent. The compositions of this invention can further comprise a free radical photoinitiator, photosensitizers, non-reactive diluents for improving the cure speed of the radiation curable compositions, thermooxidative stabilizers to improve thermal and oxidative stability of the compositions, stabilizers for improving the shelf life of the compositions and adhesion promoters.

It is an object of this invention to produce radiation curable compositions which exhibit a low cure energy.

It is an object of this invention to produce radiation curable compositions which have a high moisture vapor barrier, high damping characteristics, and a high refractive index. It is an object of this invention to produce radiation curable compositions which provide a barrier to corrosive vapors and have maintained or enhanced modulus, tensile strength, and toughness.

DETAILED DESCRIPTION OF THE INVENTION

This invention relates to a radiation curable composition comprising: (A) an alkenyl ether-functional polyisobutylene polymer in which at least 50 mole percent of the non-terminal repeating units of the polymer are isobutylene units and containing at least one group having the formula

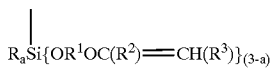

wherein R is independently selected from monovalent hydrocarbon groups and alkoxy groups, $R^1$ is a divalent hydrocarbon group having from 2 to 20 carbon atoms, $R^2$ and $R^3$ are independently selected from a hydrogen atom and a monovalent hydrocarbon group, and a has a value of 0 to 2, (B) a cationic photoinitiator, and (C) a miscible reactive diluent selected from (i) a difunctional vinyl ether reactive diluent selected from butanediol divinyl ether, pentanediol divinyl ether, hexanediol divinyl ether, heptanediol divinyl ether, cyclohexane dimethanol divinyl ether, ethylene glycol divinyl ether, diethylene glycol divinyl ether, triethylene glycol divinyl ether, neopentyl glycol divinyl ether, ethoxylated$_{2-20}$ bisphenol A divinyl ether, poly-THF divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl)cyclohexyl)methyl) succinate, bis((4-((ethenyloxy)methyl)cyclohexyl)methyl) adipate, and bis-((4-((ethenyloxy)methyl)cyclohexyl)methyl) glutarate; or (ii) an acrylate reactive diluent with the formula

wherein $R^8$ is a non-silicon containing organic group, X is an organic group containing at-least one acrylate functional group, and b has a value of 2 to 4, (iii) a monofunctional vinyl ether reactive diluent, and (iv) an epoxy functional reactive diluent.

In Component (A), the alkenyl ether-functional polyisobutylene polymer, the monovalent hydrocarbon groups of R are exemplified by alkyl groups such as methyl, ethyl, propyl, butyl, hexyl, octyl, and decyl, aryl groups such as phenyl, tolyl, and xylyl, and can also be any monovalent hydrocarbon group which has at least one of its hydrogen atoms replaced with a halogen, such as fluorine, chlorine, or bromine, and these monovalent hydrocarbon groups are exemplified by $CF_3CH_2CH_2$— and $C_4F_9CH_2CH_2$—. The alkoxy groups are exemplified by methoxy, ethoxy, propoxy, and butoxy. It is highly preferred that R is independently selected from methyl and methoxy. Each R group can be the same or different, as desired.

Divalent hydrocarbon groups suitable as $R^1$ are exemplified by alkylene groups such as ethylene, propylene, butylene, pentylene, trimethylene, 2-methyltrimethylene, pentamethylene, hexamethylene, 3-ethyl-hexamethylene, octamethylene, decamethylene, —$(CH_2)_{18}$—, and cycloalkylene groups such as cyclohexylene, arylene groups such as phenylene. Examples of suitable divalent halohydrocarbon groups also include any divalent hydrocarbon group wherein one or more hydrogen atoms have been replaced by halogen, such as fluorine, chlorine or bromine exemplified by —$CH_2CH_2CF_2CF_2CH_2CH_2$—. Each $R^1$ can be the same or different as desired. Preferably $R^1$ is butylene.

The groups $R^2$ and $R^3$ are independently selected from a group consisting of a hydrogen atom and a monovalent hydrocarbon group exemplified by alkyl groups such as methyl, ethyl, propyl, butyl. The groups $R^2$ and $R^3$ may be the same or different. Preferably $R^2$ and $R^3$ are hydrogen atoms. In the formula above, it is preferred that a have a value of zero.

For the purposes of this invention, the backbone of the alkenyl ether functional polyisobutylene polymer may be any linear or branched polymer or copolymer wherein at least about 50 mole percent, preferably at least 80 mole percent, of the repeat units are isobutylene units having the following structure:

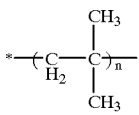

In the polymer or copolymer of the invention, the above described alkenyl ether group can be disposed either along the chain or at the terminals thereof, or any combination of the above. As used herein, the term "polymer" is generic to polymers, oligomers, and copolymers, all of which are within the scope of this invention.

In a preferred embodiment of this invention, the alkenyl-ether functional polyisobutylene polymer (A) is a polymer containing at least one group having the formula

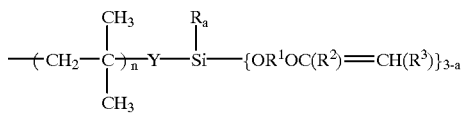

wherein at least 50 mole percent of the non-terminal repeating units of the polymer are isobutylene units, R is independently selected from monovalent hydrocarbon groups and alkoxy groups, $R^1$ is a divalent hydrocarbon group having from 2 to 20 carbon atoms, $R^2$ and $R^3$ are independently selected from group consisting of a hydrogen atom and a monovalent hydrocarbon group, n has a value from 5 to 10,000, a has a value of 0 to 2, and Y is selected from (i) an alkylene group having from 2 to 10 carbon atoms and (ii) a group having the formula

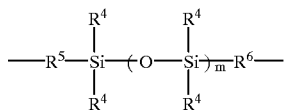

wherein $R^4$ is a monovalent hydrocarbon group, $R^5$ and $R^6$ are independently alkylene groups having from 2 to 10 carbon atoms, and m is an integer having a value from 1 to 5.

The groups R and $R^1$ are as defined hereinabove, including preferred embodiments thereof. Preferably, R is independently selected from methyl and methoxy, and $R^1$ is butylene. Preferably, a has a value of 0 or 1.

The alkylene groups of Y(i) are exemplified by ethylene, propylene, butylene, pentylene, trimethylene, 2-methyltrimethylene, pentamethylene, hexamethylene, 3-ethyl-hexamethylene, octamethylene, and decamethylene.

In the formula for Y(ii) above, the monovalent hydrocarbon groups of $R^4$ are as described above for R, and preferably $R^4$ is methyl. The alkylene groups for $R^5$ and $R^6$ are as defined above for Y(i). Preferably, $R^5$ and $R^6$ are independently selected from ethylene and propylene. It is highly preferred that $R^5$ is propylene, and $R^6$ is ethylene. It is also preferred that m has a value of 1.

It is preferred for purposes of this invention that from 10 to 100 weight percent of the alkenyl ether functional polyisobutylene polymer described above be used, and it is highly preferred that from 50 to 100 weight percent of this compound be employed, said weight percent being based on the total weight of the radiation curable composition.

Component (B) in the compositions of this invention is a cationic photoinitiator. Suitable cationic photoinitiators are selected from onium salts, diaryliodonium salts of sulfonic acids, triarylsulfonium salts of sulfonic acids, diaryliodonium salts of boronic acids, and triarylsulfonium salts of boronic acids.

The onium salts are preferably selected from $R^7_2I^+MX_z^-$, $R^7_3S^+MX_z^-$, $R^7_3Se^+MX_z^-$, $R^7_4P^+MX_z^-$, and $R^7_4N^+MX_z^-$, wherein each $R^7$ is an organic group having from 1 to 30 carbon atoms exemplified by aromatic carbocyclic groups having from 6 to 20 carbon atoms. Each $R^7$ can be substituted with from 1 to 4 monovalent hydrocarbon groups exemplified by alkoxy groups having from 1 to 8 carbon atoms, alkyl groups having from 1 to 16 carbon atoms, nitro, chloro, bromo, cyano, carboxyl, mercapto, and aromatic heterocyclic groups exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd, Pr, and Nd, and metalloids exemplified by B, P, and As. $MX_z^-$ is a non-basic, non-nucleophilic anion exemplified by $BF_4^-$, $B(C_6F_5)_4^-$, $PF_6^-$, $AsF_6^-$, $SbF_6^-$, $SbCl_6^-$, $HSO_4^-$, $ClO_4^-$, $FeCl_4^=$, $SnCl_6^-$, and $BiCl_5^=$.

Preferred onium salts are exemplified by bis-diaryl iodonium salts, for example, bis(dodecyl phenyl) iodonium hexafluoroarsenate such as UV 9380C (General Electric, Schenectady, N.Y.) (supplied as a dispersion of bis(dodecyl phenyl) iodonium hexafluoroarsenate in alcohol and epoxy functional hydrocarbons), tolyl-cumyliodonium tetrakis (pentafluorophenyl) borate (Rhodorsil® 2074 supplied as 20% solution in diacetone alcohol), bis(dodecylphenyl) iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator (B). Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid. Preferred diaryliodonium salts of aryl sulfonic acids are exemplified by diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are triarylsulfonium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferably the amount of cationic photoinitiator (B) is from 0.01 to 5.0 weight percent based on the total weight of the composition, and it is highly preferred to use from 0.1 to 2.0 weight percent based on the total weight of the radiation curable composition.

Component (C) is a reactive a miscible reactive diluent selected from (C)(i) a difunctional vinyl ether reactive, (C)(ii) an acrylate reactive diluent with the formula (R⁸)X<sub>b</sub> wherein $R^8$ is a non-silicon containing organic group, X is an organic group containing at-least one acrylate functional group, and b has a value of 2–4, (C)(iii) a monofunctional vinyl ether reactive diluent, and (C)(iv) an epoxy functional reactive diluent.

Component (C)(i) of the present invention is a difunctional vinyl ether reactive diluent selected from butanediol divinyl ether, pentanediol divinyl ether, hexanediol divinyl ether, heptanediol divinyl ether, cyclohexane dimethanol divinyl ether, ethylene glycol divinyl ether, diethylene glycol divinyl ether, triethylene glycol divinyl ether, neopentyl glycol divinyl ether, ethoxylated$_{2-20}$ bisphenol A divinyl ether, poly-THF divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl) cyclohexyl)methyl) succinate, bis((4-((ethenyloxy)methyl) cyclohexyl)methyl) adipate, and bis-((4-((ethenyloxy) methyl)cyclohexyl)methyl) glutarate.

Component (C)(ii) in the compositions of this invention is a miscible reactive diluent having the formula (R⁸)X<sub>b</sub> wherein $R^8$=a non-silicon containing organic group; X=organic group containing at-least one acrylate functional group; and b=2–4. The $R^8$ group is selected to be the one that is compatible with component (A). The $R^8$ group has between 2 to 30 carbon atoms, and preferably between 4 to 18 carbon atoms. The acrylate functional reactive diluent can be monofunctional, difunctional, or trifunctional.

Component (C)(ii) is exemplified by ethyl acrylate, propyl acrylate, butyl acrylate, tert-butyl acrylate, tert.-amyl acrylate, hexyl acrylate, cyclohexyl acrylate, 2-ethylhexyl acrylate, isooctyl acrylate, isodecyl acrylate, dodecyl acrylate, lauryl acrylate, stearyl acrylate, ethyleneglycol butyl acrylate, tetrahydrofurfuryl acrylate, isobornyl acrylate, tridecyl acrylate, caprolactone acrylate, 2-phenoxyethyl acrylate, ethoxylated nonyl phenol acrylate, butanediol diacrylate, hexanediol diacrylate, cyclohexane dimethanol diacrylate, ethylene glycol diacrylate, diethylene glycol diacrylate, triethylene glycol diacrylate, neopentyl glycol diacrylate, ethoxylated$_{2-20}$ bisphenol A diacrylate, poly-THF diacrylate, and trimethylolpropane tri acrylate.

Component (C)(iii) of the present invention is a monofunctional vinyl ether reactive diluent selected from cyclohexyl vinyl ether, cyclohexanedimethanol monovinyl ether, hydroxybutyl vinyl ether, dodecyl vinyl ether, diethyleneglycol monovinyl ether, 2-ethylhexyl vinyl ether, octadecyl vinyl ether, and tetradecyl vinyl ether.

Component (C)(iv) of the present invention is an epoxy functional reactive diluent. An "epoxy functional reactive diluent" is defined for purposes of this invention as any hydrocarbon containing an epoxy group. Illustrative examples of epoxy functional reactive diluents include, but are not limited to propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, 1,4-butanediol diglycidyl ether, resorcinol diglycidyl ether, dodecyl glycidyl ether, tetradecyl glycidyl ether and their mixtures, epoxy organo-silicone monomers, e.g., dimethylsiloxanes having cycloaliphatic epoxide or glycidyl ether groups with $C_{4-16}$ hydrocarbon groups and dipentene dioxide. Preferably the epoxy reactive diluent is selected from monofunctional, bifunctional, and polyfunctional epoxy monomers. Exemplary monofunctional epoxy monomers include; cycloaliphatic monoepoxies and mixtures of cycloaliphatic monoepoxies, available from Union Carbide under the tradename UVR 6100 having an epoxy equivalent weight of 130 to 140; limonene monoxide; epoxidized alpha olefin hydrocarbons containing 4 to 16 carbon atoms, organo-silicone epoxy monomers, and alpha pinene oxide. Exemplary bifunctional epoxy monomers include; limonene dioxide, bisphenol-A epoxy, cycloaliphatic diepoxides such as bis(3,4-epoxycyclohexyl)adipates and 3,4-epoxycyclohexylmethyl-3,4-epoxycyclohexane carboxylate (commercially available from Union Carbide under the tradename Cyracure 6105 and Cyracure 6110 and from Sartomer under the tradename Sarcat.RTM). Exemplary polyfunctional epoxy monomers include; epoxidized soybean oil, linseed fatty acid esters and the like. More preferably, the epoxy reactive diluent is selected from epoxidized alpha olefin hydrocarbons containing 4 to 16 carbon atoms, 1,4-butanediol diglycidyl ether and dodecyl glycidyl ether. Most preferably, the epoxy reactive diluent is selected from dodecyl glycidyl ether, tetradecyl glycidyl ether and their mixtures.

Preferably the amount of miscible reactive diluent (C) is from 1 to 60 weight percent based on the total weight of the composition, and it is highly preferred to use from 5 to 40 weight percent based on the total weight of the radiation curable composition.

Various optional components may be used in the composition beyond Components (A) through (C). The photocuring of alkenyl-ethers is a cationic process. One way known in the art to increase cure speeds of cationic systems is to use one or more free radical photoinitiators and photosensitizers. The use of non-reactive diluents may be required to efficiently disperse the photocatalyst, photoinitiators and photosensitizers into the polyisobutylene matrix.

The free radical photoinitiators for use in the compositions of this invention can be any benzoins exemplified by benzoin alkyl ethers, benzophenone and its derivatives such as 4,4'-dimethyl-amino-benzophenone (Michler's Ketone), acetophenones exemplified by dialkoxyacetophenones, dichloroacetophenones, and trichloroacetophenones, benzils exemplfied by benzil ketals, quinones, and O-acylated-α-oximinoketones. Preferably the free radical photoinitiator is a compound having the formula

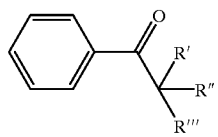

wherein R' is selected from —H, an alkoxy group, and a halogen atom, R" is selected from —OH, an alkoxy group, and a halogen atom, and R'" is selected from —H, an alkyl group, and a halogen atom. Preferred embodiments of this compound are (i) where R' is —H, R" is —OH and R'" is methyl or phenyl, (ii) where R' is —H, R" is an alkoxy group and R'" is phenyl (for benzoin alkyl ethers), (iii) where both R' and R" are alkoxy groups and R'" is phenyl (for benzil ketals), (iv) where both R' and R" are alkoxy groups and R'" is —H (for dialkoxyacetophenones), and (v) where both R' and R" are —Cl and R'" is —Cl or —H (for di- and tri-chloroacetophenones). A preferred free radical photoinitiator is Darocure® 1173 (2-hydroxy-2-methyl-1-phenyl-propan-1-one).

Preferably the amount of free radical photoinitiator is from 0.01 to 5.0 weight percent based on the total weight of the composition, and it is highly preferred to use from 0.1 to 2.0 weight percent based on the total weight of the radiation curable composition.

Preferred photosensitizers are 2-isopropylthioxanthone or benzophenone.

Preferably the amount of photosensitizer is from 0.01 to 2.0 weight percent based on the total weight of the composition, and it is highly preferred to use from 0.05 to 0.5 weight percent based on the total weight of the radiation curable composition.

Non-UV curable diluents can also be added to the compositions of the present invention to efficiently disperse the photocatalyst, photoinitiators and photosensitizers into the polyisobutylene matrix. Non-UV curable diluents added for this purpose can be selected from hydrocarbons generally having the following characteristics; non-extractable, high flash point, low evaporation rate, low viscosity, high solubility parameters, and non-toxic. Preferred non-UV curable diluents are hydrocarbon diluents with $C_{4-20}$ hydrocarbon chain lengths; long chain hydrocarbon diluents with ester, ether, anhydride and carbonyl functional groups. Suitable examples include methyl laurate, methyl nonate, ethyl laurate, dioctyl adipate, di-(2-ethylhexyl) phthalate, di-2-ethylhexyl ether, dioctadecyl ether, and succinic anhydride.

Preferably the amount of non-UV curable diluent is from 0.01 to 2.0 weight percent based on the total weight of the composition, and it is highly preferred to use from 0.05 to 0.5 weight percent based on the total weight of the radiation curable composition.

To improve thermal and oxidative stability of the cured coating one or more stabilizers may be included in the composition. Examples of suitable stabilizers are hindered amines, organic phosphites, hindered phenols and mixtures thereof. Some of the preferred stabilizers are: Irganox™ 1520D; Irganox™ 1010, Irganox™ 1135; Tinuvin™ 123 and Tinuvin™ 292.

Preferably the amount of stabilizer is from 0.01 to 2.0 weight percent based on the total weight of the composition, and it is highly preferred to use from 0.05 to 0.5 weight percent based on the total weight of the radiation curable composition.

To improve shelf stability of the un-cured coating one or more stabilizers may be included in the composition. This requires the use of stable photoinitiator compositions as described in the U.S. Pat. No. 5,973,020. These stabilizing agents are usually hindered amines with boiling points of greater than 150° C. and preferably greater than 200° C. The amine can be a primary, secondary or tertiary amine and preferably a secondary and tertiary amine. Examples are Tinuvin products sold by Ciba-Geigy company, the CYAGARD products sold commercially by Cytec Corporation (Stamford, Conn.) and SANDUVAR products as referenced in the U.S. Pat. No. 5,973,020.

Preferably the amount of stabilizer generally used, by weight in relation to the total weight of the cationic photoinitiator (B) is from 0.01 to 2.0 percent by weight of the cationic photoinitiator solids and more preferably between 0.2 to 1.0 weight percent.

The radiation curable compositions of this invention can also contain adhesion promoters to enhance the adhesion of the cured film compositions of this invention to glass or siliceous surfaces. Generally, the adhesion promoter can be selected from organofunctional silanes known in the art to enhance the adhesion of organic polymeric films to glass or siliceous surfaces. Often, these organofunctional silanes are referred to as silane coupling agents in the art. Typical of the organofunctional silanes that can be added to the curable compositions of this invention are those described in U.S. Pat. No. 6,042,943, which is hereby incorporated by reference. Preferably the organofunctional silane is selected from 3-(trimethoxysilyl)propyl acrylate, methacryloxypropyltrimethoxysilane, tetraethoxysilane, allyltrimethoxysilane, vinyltrimethoxysilane, vinyltriethoxysilane, octyltriethoxysilane, methyltriethoxysilane, methyltrimethoxysilane, vinylmethyldimethoxysilane, β-(3,4-epoxycyclohexyl)ethyltrimethoxysilane, and γ-glycidylpropyltrimethoxysilane. More preferably, the organofunctional silane is methacryloxypropyltrimethoxysilane, such as Z-6030 and vinyltriethoxysilane such as 1-6518, sold by Dow Corning Corporation (Midland, Mich.).

The amount of adhesion promoter added to the composition can vary, but generally is 0.05 to 5.0 weight percent of the total composition. More preferably, the adhesion promoter is 0.1 to 3 weight percent of the total composition, and most preferably is 0.5 to 1.5 weight percent.

The radiation curable compositions of this invention can also contain ingredients exemplified by reinforcing and extending fillers such as treated silicas, hydrocarbon diluents such as linear alkyl dodecylbenzene and functional hydrocarbons such as $C_{8-16}$ aliphatic glycidyl ethers, colorants, dyes, preservatives, fragrances, and adhesion modifiers.

The radiation curable compositions of this invention can be prepared by mixing the materials described hereinabove and any optional components in any order, using any suitable mixing means, such as a spatula, a drum roller, a mechanical stirrer, a three-roll mill, a sigma blade mixer, a bread dough mixer, or a two-roll mill.

This invention further relates to a method of making a radiation curable composition comprising (I) mixing components (A)–(C) and the optional ingredients described hereinabove. Components (A)–(C) and the optional ingredients are as described above, including preferred embodiments and amounts thereof.

The present invention further relates to a method of making an article of manufacture comprising (I) applying a radiation curable composition comprising components (A)–(C) described hereinabove, to a solid substrate to form a coating, and (II) exposing the coating to an energy source selected from (i) ultraviolet light and (ii) visible light in an amount sufficient to cure the coating.

The composition of (I) can further comprise any of the optional ingredients recited above. Components (A)–(C) and the optional ingredients are as described above, including preferred embodiments and amounts thereof.

The coating may be applied by any suitable manner known in the art, such as by spreading, brushing, extruding, spraying, gravure, kiss-roll and air-knife.

The solid substrate can be a flexible sheet material such as paper, polyolefin film, polyolefin-coated paper, foil, wood, cardboard and cotton, metallic materials such as aluminum, copper, steel and silver, siliceous materials such as glass and stone, and synthetic polymer materials such as polyolefins, polyamides, polyesters and polyacrylates. As to form, the solid substrate can be substantially sheet-like, such as a peelable release liner for pressure sensitive adhesive, a fabric or a foil, or a fiber, or a substantially three-dimensional in form.

Curing itself may be achieved in any of the known ways, including passing a coated substrate under the desired source of radiation, for example a UV lamp, at a predetermined rate and exposing a completely coated substrate to radiation by switching on the required energy source for a predetermined time.

The radiation curable compositions are preferably cured in the form of films. The cured films are expected to have high refractive index, good barrier properties, good adhesion and good damping properties. It is preferable to apply these coatings to surfaces that are adversely affected by exposure to oxygen, moisture vapor and other environmental factors. The radiation curable coatings are particularly useful as high refractive index coatings for optical fibers. The application of the radiation curable compositions to optical fibers and curing of the compositions can be achieved by conventional equipment (see Blyler and Aloisio Polymers for Coating Optical Fibers, Chemtech, Nov. 1987, pages 680–684). The curable compositions can also be used as an additive to compositions whose barrier properties need tailored to higher values. The radiation curable compositions can be used to increase the barrier properties of sealants and pottants used for encapsulating electronic devices that are adversely affected by moisture.

EXAMPLES

Materials: The allyl functional polyisobutylene (PIB) polymer was made by Kaneka Corporation (1-12-32 Akasaka, Minato-ku, Tokyo 107, Japan) and is called Epion™ 200A polymer. Hydroxybutyl vinyl ether, hexanediol divinyl ether (HDDVE), cyclohexanedimethanol divinyl ether (CHDVE) and butanediol divinyl ether (BDDVE) were purchased from BASF Corporation. 1,6-hexanediol diacrylate (SR-238) was purchased from Sartomer Corporation, Lancaster, PA. Dodecyl/tetradecyl glycidyl ether (technical grade) was purchased from Aldrich Chemical Company. Liquid A denotes a compound having the formula $C_{12}H_{25}Si(Me)_2$—O—$Si(Me)_2$—$C_2H_4$—Si$(OC_4H_8OCH=CH_2)_3$. UV 9380C (General Electric, N.Y.), which is a mixture of bis(4-dodecylphenyl) iodonium hexafluoroantimonate (30–60 weight percent), $C_{12-14}$ alkylglycidyl ethers (30–60 weight percent), linear alkylate dodecylbenzene (5–10 weight percent), 2-isopropylthioxanthone (1–5 weight percent) was used as the photocatalyst and is referred to as "iodonium catalyst" in the Examples here-in-below. Darocur® 1173 (2-hydroxy-2-methyl-1-phenyl-propan-1-one), a free radical photoinitiator from Ciba Geigy, Terrytown, N.Y. was used. Tinuvin® 292 and Irganox® 1135 or 1520D, a hindered amine light stabilizer and an antioxidant respectively from Ciba Geigy, Terrytown, N.Y. was used. Other solvents and common reagents used in the examples were obtained from Aldrich Chemical Company (PO Box 355, Milwaukee, Wis. 53201, USA). The platinum (vinylsiloxane) catalyst was prepared by the procedure of Hitchcock et. al., Angew. Chem. Int. Ed. Engl. 1991, 30. $^{13}C$ and $^{29}Si$ Proton nuclear magnetic resonance spectroscopy was used to confirm the structures. Molecular weight of PIB polymers was determined by gel permeation chromatography using PIB standards.

Cure Studies: The formulations were mixed in a Hauschild mixer by adding the desired amounts of components as noted in the example 3. The cure studies were conducted using a 930 model DPC (DuPont Instruments, Wilmington, Del.) and a model 910 differential scanning calorimeter (DSC, DuPont Instruments) equipped with an Oriel 200 watt high pressure mercury arc lamp. The UV exposure time was controlled by a computer activated shutter blade. The UV intensity was quantified with a UV radiometer. The UV radiation passed through UV windows into a temperature controlled oven of the Dupont 910 DSC. The sample was placed in an open aluminum pans inside the DSC oven. A constant weight of approximately 10 milligrams was used for each measurement. The oven of the DSC was purged with either air or nitrogen for the experiment. The sample temperature was obtained from a thermocouple which was calibrated for the melting point of indium. The data was analyzed using V4.1 A DuPont 21000 software.

Example 1

A methoxysilyl-functional polymer was prepared by mixing 1 mole of Epion 200A polymer per each 2 moles of siloxane described by the formula $HSi(Me)_2$—O—$Si(Me)_2$—$C_2H_4$—$Si(OMe)_3$ (see Example 1 of U.S. Pat. No. 4,808,664), at 80 degrees centigrade for one hour, in a high shear mixer. At the end of a one hour mixing time, 0.05 grams of a solution of platinum catalyst in toluene (25.2 weight percent platinum metal) was added to the mixer. After an additional 45 minutes of reaction time the heating was stopped and the reaction product was stored under inert conditions. The proton nuclear magnetic resonance spectrum of a small sample of the reaction product confirmed that the product had the following structure:

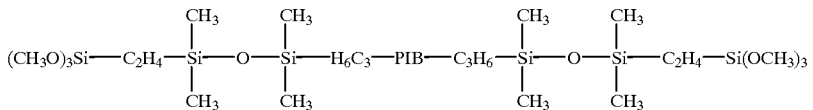

(PIB denotes the initial polyisobutylene polymer). Molecular weight data: $M_n$=5740; $M_w$6985; $M_w/M_n$=1.21.

Example 2

The methoxysilyl functional PIB prepared as described in Example 1 was dissolved in toluene (25 weight percent solvent) in a flask equipped with a mechanical stirrer, thermometer, heating mantle, and a condenser. Hydroxybutyl vinyl ether was added to the flask at a molar ratio of 0.95:1 vinyl-ether to methoxy. 500 ppm of titanium-tetraisopropyl titanate catalyst was added and the contents of the flask were maintained at 90° C. for 1 hour. After 1 hour of heating, the flask was evacuated to approximately 100 mm Hg for methanol removal. This process was repeated three times to ensure complete reaction as measured by the consumption of hydroxy functional groups using IR spectroscopy. All volatile materials from the reaction mixture were removed using a wipe film evaporator. Proton nuclear magnetic resonance spectrum of a small sample of the product confirmed that on average more than 66% of the methoxysilyl groups had reacted. Molecular weight data: $M_n$=6810; $M_w$8992; $M_w/M_n$=1.32. This polymer is hereinafter referred to as POLYMER A.

Comparison Example 1

A radiation curable coating composition was prepared by mixing together the following ingredients:

| Ingredient | Parts by weight |
| --- | --- |
| Polymer A | 74 |
| Liquid A | 25 |
| Iodonium Catalyst | 0.5 |
| Darocur ® 1173 | 0.5 |

The viscosity of uncured coating was 15,700 cP at 25 degree C. (using a Carrimed controlled stress rheometer, model CSL-500). The measurement was made using 2 cm diameter 4° angle cone and plate geometry at gap setting of 111.6 μm. The viscosity measurements at 50 and 75 degree centigrade are 3,456 cP and 1089 cP respectively.

The cure studies were performed on DPC apparatus as described above. The DPC results are showed that cure speeds vary between 55 and 134 watts/g/min., at a cure energy of 100 and 500 mJ/cm². A 15 mil thick coating of this composition was applied on a mylar film and cured in air. After allowing to cured film to age under ambient conditions for 24 hours the following measurements were made on the cured films.

The tensile strength and elongation at break were 386 psi and 24% respectively at ambient conditions. The cured coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
| --- | --- | --- | --- | --- | --- |
| Storage Modulus (MPa) | 2.40 | 2.82 | 5.76 | 31.74 | 450.4 |

The percent water absorption of the this material was measured to be 5.46% after 72 hours of immersion. MPa denotes MegaPascals.

Example 3

A radiation curable coating composition was prepared by mixing together the following ingredients:

| Ingredient | Parts by weight |
| --- | --- |
| Polymer A | 74 |
| CHDVE | 25 |
| Iodonium Catalyst | 0.5 |
| Darocur ® 1173 | 0.5 |

The viscosity of uncured coating was 8,585 cP at 25 degree C. The viscosity measurements at 50 and 75 degree centigrade are 2,057 cP and 810 cP respectively.

The cure studies were performed on DPC apparatus as described above. The DPC results are showed that cure speeds are 95 and 115 watts/g/min., at a cure energy range of 100 and 500 mJ/cm² respectively. A 15 mil thick coating of this composition was applied on a mylar film and cured in air. After allowing to cured film to age under ambient conditions for 24 hours the following measurements were made on the cured films.

The tensile strength and elongation at break were 608 psi and 10% respectively. The cured coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
| --- | --- | --- | --- | --- | --- |
| Storage Modulus (MPa) | 43.0 | 60.3 | 106.4 | 321 | 1885 |

The percent water absorption of the UV cured material was measured to be 0.11% after 72 hours of immersion.

Example 4

A radiation curable coating composition was prepared by mixing together the following ingredients:

| Ingredient | Parts by weight |
| --- | --- |
| Polymer A | 74 |
| HDDVE | 25 |
| Iodonium Catalyst | 0.5 |
| Darocur ® 1173 | 0.5 |

The viscosity of uncured coating was 3500 cP at 25 degree C. (using a Carrimed controlled stress rheometer, model CSL-500).

The cure studies were performed on DPC apparatus as described above. The DPC results are showed that cure speeds are 86 and 140 watts/g/min., at a cure energy range of 100 and 500 mJ/cm² respectively. A 15 mil thick coating of this composition was applied on a mylar film and cured in air. After allowing to cured film to age under ambient conditions for 24 hours the following measurements were made on the cured films.

The tensile strength and elongation at break were 334 psi and 20% respectively. The cured primary coating had a glass transition temperature in the range of (−50° C.) to (−40° C.) as measured by the peak in the tan delta curve, and cured film refractive index of 1.48. The effect of temperature on modulus is as follows:

| Temperature (° C.) | 25 | 0 | −25 | −50 | −70 |
| --- | --- | --- | --- | --- | --- |
| Storage Modulus (MPa) | 9.14 | 15.31 | 36.79 | 164.5 | 1779 |

The percent water absorption of this material was measured to be 0.5 weight percent 72 hours of immersion.

Example 5

A radiation curable coating composition was prepared by mixing together the following ingredients:

| Ingredient | Parts by weight |
| --- | --- |
| Polymer A | 89 |
| SR238 | 10 |
| Iodonium Catalyst | 0.5 |
| Darocur ® 1173 | 0.5 |

The viscosity of uncured coating was 83,000 cP at 25 degree C. The cure studies were performed on DPC apparatus as described above. The DPC results showed that cure speeds is 38 watts/g/min., at a cure energy range of 485 mJ/cm$^2$. A 18 mil thick coating of this composition was applied on a mylar film and cured in air. After allowing to cured film to age under ambient conditions for a variable amount of time the following measurements were made on the cured films.

The tensile strength and elongation at break were 131 psi and 72% respectively after 24 hours at ambient conditions. After aging the film under ambient conditions for 3 days and 7 days the tensile strength increased to 223 psi and 198 psi respectively. The elongation at break changed to 109% and 93%.

Example 6

A radiation curable coating composition was prepared by mixing together the following ingredients:

| Ingredient | Parts by weight |
| --- | --- |
| Polymer A | 74 |
| BDDVE | 24 |
| Iodonium Catalyst | 0.5 |
| Darocur ® 1173 | 0.5 |
| Irganox ® 1520D | 1.0 |

The viscosity of uncured coating was 2260 cP at 25 degree C. (using a Carrimed controlled stress rheometer, model CSL-500). The viscosity measurements at 40° C. and 60° C. are 1325 cP and 571 cP respectively. The cure studies were performed on DPC apparatus as described above. The DPC results are showed that cure speeds are 88 and 133 watts/g/min., at a cure energy range of 100 and 500 mJ/cm$^2$ respectively. A 15 mil thick coating of this composition was applied on a mylar film and cured in air. After allowing to cured film to age under ambient conditions for 24 hours, the following measurements were made on the cured films.

The tensile strength and elongation at break were 310 psi and 23.4% respectively. The cured primary coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
| --- | --- | --- | --- | --- | --- |
| Storage Modulus (MPa) | 7.30 | 12.0 | 28.5 | 145 | 1496 |

Example 7

A radiation curable coating composition was prepared by mixing together the following ingredients:

| Ingredient | Parts by weight |
| --- | --- |
| Polymer A | 78.31 |
| Dodecyl vinyl ether | 19.58 |
| Iodonium Catalyst | 0.5 |
| Darocur ® 1173 | 0.5 |
| Irganox ® 1135 | 0.1 |
| Tinuvin ® 292 | 0.01 |
| Z-6030 | 1.0 |

The viscosity of uncured coating was 6422 cP at 25 degree C. (using a Carrimed controlled stress rheometer, model CSL-500). The viscosity measurements at 40° C. and 60° C. are 4531 cP and 1495 cP respectively. The cure studies were performed on DPC apparatus as described above. The DPC results are showed that cure speeds are 3.4 and 52.4 watts/g/min., at a cure energy range of 100 and 500 mJ/cm$^2$ respectively. A 15-mil thick coating of this composition was applied on a mylar film and cured in air. After allowing to cured film to age under ambient conditions for 24 hours, the following measurements were made on the cured films.

The tensile strength and elongation at break were 77 psi and 34.7% respectively. The cured primary coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
| --- | --- | --- | --- | --- | --- |
| Storage Modulus (MPa) | 0.746 | 0.750 | 1.194 | 24.38 | 686.9 |

Example 8

A radiation curable coating composition was prepared by mixing together the following ingredients:

| Ingredient | Parts by weight |
| --- | --- |
| Polymer A | 79.2 |
| Dodecyl/tetradecyl glycidyl ether | 19.8 |
| Iodonium Catalyst | 0.5 |
| Darocur ® 1173 | 0.5 |

The viscosity of uncured coating was 12700 cP at 25 degree C. (using a Carrimed controlled stress rheometer, model CSL-500). The viscosity measurements at 40° C. and 60° C. are 5807 cP and 3646 cP respectively. The cure studies were performed on DPC apparatus as described above. The DPC results are showed that cure speeds are 10.6 and 9.0 watts/ g/min., at a cure energy range of 100 and 500 mJ/cm² respectively. A 15-mil thick coating of this composition was applied on a mylar film and cured in air. After allowing to cured film to age under ambient conditions for 24 hours, the following measurements were made on the cured films.

The tensile strength and elongation at break were 52 psi and 161% respectively. The cured primary coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
|---|---|---|---|---|---|
| Storage Modulus (MPa) | 0.168 | 0.316 | 4.139 | 40.24 | 525.5 |

Example 9

A radiation curable coating composition was prepared by mixing together the following ingredients:

| Ingredient | Parts by weight |
|---|---|
| Polymer A | 79.4 |
| Dodecyl/tetradecyl glycidyl ether | 9.8 |
| Dodecyl vinyl ether | 9.8 |
| Iodonium Catalyst | 0.5 |
| Darocur ® 1173 | 0.5 |

The viscosity of uncured coating was 9463 cP at 25 degree C. (using a Carrimed controlled stress rheometer, model CSL-500). The viscosity measurements at 40° C. and 60° C. are 4211 cP and 1944 cP respectively. The cure studies were performed on DPC apparatus as described above. The DPC results are showed that cure speeds are 7.8 and 21.6 watts/ g/min., at a cure energy range of 100 and 500 mJ/cm² respectively. A 15-mil thick coating of this composition was applied on a mylar film and cured in air. After allowing to cured film to age under ambient conditions for 24 hours, the following measurements were made on the cured films.

The tensile strength and elongation at break were 77 psi and 74.3% respectively. The cured primary coating had a glass transition temperature in the range of (−50° C.) to (−40° C.) as measured by the peak in the tan delta curve, and cured film refractive index of >1.48. The effect of temperature on modulus is as follows:

| Temperature (° C.) | 25 | 0 | −25 | −50 | −70 |
|---|---|---|---|---|---|
| Storage Modulus (MPa) | 0.6845 | 0.7822 | 2.487 | 25.20 | 503.5 |

That which is claimed is:

1. A radiation curable composition comprising:

(A) an alkenyl ether-functional polyisobutylene polymer in which at least 50 mole percent of the non-terminal repeating units of the polymer are isobutylene units and containing at least one group having the formula

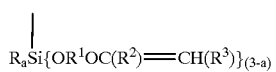

wherein R is independently selected from monovalent hydrocarbon groups and alkoxy groups, $R^1$ is a divalent hydrocarbon group having from 2 to 20 carbon atoms, $R^2$ and $R^3$ are independently selected from a hydrogen atom and a monovalent hydrocarbon group, and a has a value of 0 to 2;

(B) a cationic photoinitiator; and (C) a miscible reactive diluent selected from (i) a difunctional vinyl ether reactive diluent selected from butanediol divinyl ether, pentanediol divinyl ether, hexanediol divinyl ether, heptanediol divinyl ether, cyclohexane dimethanol divinyl ether, ethylene glycol divinyl ether, diethylene glycol divinyl ether, triethylene glycol divinyl ether, neopentyl glycol divinyl ether, ethoxylated$_{2-20}$ bisphenol A divinyl ether, poly-THF divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl)cyclohexyl)methyl) succinate, bis((4-((ethenyloxy)methyl)cyclohexyl)methyl) adipate, and bis-((4-((ethenyloxy)methyl) cyclohexyl)methyl) glutarate or (ii) an acrylate reactive diluent with the formula

wherein $R^8$ is a non-silicon containing organic group, X is an organic group containing at-least one acrylate functional group, and b has a value of 2–4, (iii) a monofunctional vinyl ether reactive diluent selected from cyclohexyl vinyl ether, cyclohexanedimethanol monovinyl ether, hydroxybutyl vinyl ether, dodecyl vinyl ether, diethyleneglycol monovinyl ether, 2-ethylhexyl vinyl ether, octadecyl vinyl ether, and tetradecyl vinyl ether, and mixtures thereof, and (iv) an epoxy functional reactive diluent.

2. The composition according to claim 1, wherein R is independently selected from methyl and methoxy, $R^1$ is butylene, $R^2$ and $R^3$ are hydrogen atoms, and a has a value of zero.

3. The composition according to claim 1, wherein (A) is a polymer containing at least one group having the formula

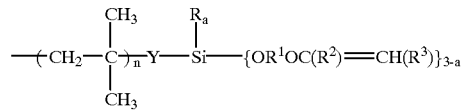

wherein at least 50 mole percent of the non-terminal repeating units of the polymer are isobutylene units, R is independently selected from monovalent hydrocarbon groups and alkoxy groups, $R^1$ is a divalent hydrocarbon group having from 2 to 20 carbon atoms, $R^2$ and $R^3$ are independently selected from group consisting of a hydrogen atom and a monovalent hydrocarbon group, n has a value from 5 to 10,000, a has a value of 0 to 2, and Y is selected from (i) an alkylene group having from 2 to 10 carbon atoms and (ii) a group having the formula

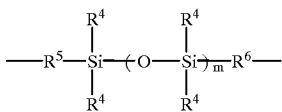

where R⁴ is a monovalent hydrocarbon group, R⁵ and R⁶ are independently alkylene groups having from 2 to 10 carbon atoms, and m is an integer having a value from 1 to 5.

4. The composition according to claim 3, wherein R is independently selected from methyl and methoxy, R¹ is butylene, R² and R³ are hydrogen atoms, a has a value of 0 or 1, and Y(i) is selected from ethylene, propylene, butylene, pentylene, trimethylene, 2-methyltrimethylene, pentamethylene, hexamethylene, 3-ethyl-hexamethylene, octamethylene, and decamethylene.

5. The composition according to claim 3, wherein R is independently selected from methyl and methoxy, R¹ is butylene, R² and R³ are hydrogen atoms, and a has a value of 0 or 1, R⁴ is methyl, R⁵ is propylene, R⁶ is ethylene, and m has a value of 1.

6. The composition according to claim 1, wherein (B) is selected from onium salts, diaryliodonium salts of sulfonic acids, triarylsulfonium salts of sulfonic acids, diaryliodonium salts of boronic acids, and triarylsulfonium salts of boronic acids.

7. The composition according to claim 1, wherein (B) is selected from bis(dodecyl phenyl) iodonium hexafluoroarsenate, bis(dodecylphenyl) iodonium hexafluoroantimonate, dialkylphenyl iodonium hexafluoroantimonate, diaryliodonium salts of perfluorobutanesulfonic acid, diaryliodonium salts of perfluoroethanesulfonic acid, diaryliodonium salts of perfluoro-octanesulfonic acid, diaryliodonium salts of trifluoromethane sulfonic acid, diaryliodonium salts of para-toluene sulfonic acid, diaryliodonium salts of dodecylbenzene sulfonic acid, diaryliodonium salts of benzene sulfonic acid, diaryliodonium salts of 3-nitrobenzene sulfonic acid, triarylsulfonium salts of perfluorobutanesulfonic acid, triarylsulfonium salts of perfluoroethanesulfonic acid, triarylsulfonium salts of perfluoro-octanesulfonic acid, triarylsulfonium salts of trifluoromethane sulfonic acid, triarylsulfonium salts of para-toluene sulfonic acid, triarylsulfonium salts of dodecylbenzene sulfonic acid, triarylsulfonium salts of benzene sulfonic acid, triarylsulfonium salts of 3-nitrobenzene sulfonic acid, diaryliodonium salts of perhaloarylboronic acids, and triarylsulfonium salts of perhaloarylboronic acid.

8. The composition according to claim 1, wherein (C)(i) is selected from butanediol divinyl ether, hexanediol divinyl ether, and cyclohexane dimethanol divinyl ether.

9. The composition according to claim 1, wherein (C)(ii) is selected from ethyl acrylate, propyl acrylate, butyl acrylate, tert.-butyl acrylate, tert.-amyl acrylate, hexyl acrylate, cyclohexyl acrylate, 2-ethylhexyl acrylate, isooctyl acrylate, isodecyl acrylate, dodecyl acrylate, lauryl acrylate, staryl acrylate, ethyleneglycol butyl acrylate, tetrahydrofurfuryl acrylate, isobornyl acrylate, tridecyl acrylate, caprolactone acrylate, 2-phenoxyethyl acrylate, and ethoxylated nonyl phenol acrylate, butanediol diacrylate, hexanediol diacrylate, cyclohexane dimethanol diacrylate, ethylene glycol diacrylate, diethylene glycol diacrylate, triethylene glycol diacrylate, neopentyl glycol diacrylate, ethoxylated$_{2-20}$ bisphenol A diacrylate, poly-THF diacrylate, and trimethylolpropane tri acrylate.

10. The composition according to claim 1, wherein (C)(iii) is octadecyl vinyl ether or tetradecyl vinyl ether.

11. The composition according to claim 1, wherein (C)(iv) is selected from epoxidized alpha olefin hydrocarbons containing 4 to 16 carbon atoms, 1,4-butanediol diglycidyl ether and dodecyl glycidyl ether.

12. The composition according to claim 1, wherein (C) (iv) is selected from dodecyl glycidyl ether, tetradecyl glycidyl ether and their mixtures.

13. The composition according to claim 1, wherein the composition further comprises at least one ingredient selected from free radical photoinitiators, photosensitizers, long chain hydrocarbon diluents having ester, ether, anhydride, or carbonyl functional groups, and stabilizers.

14. The composition according to claim 13, wherein the free radical photoinitiator is 2-hydroxy-2-methyl-1-phenyl-propan-1-one, wherein the photosensitizer is 2-isopropylthioxanthone or benzophenone, wherein the long chain hydrocarbon diluent is methyl laurate, methyl nonate, ethyl laurate, dioctyl adipate, di-(2-ethylhexyl) phthalate, di-2-ethylhexyl ether, dioctadecyl ether, or succinic anhydride, and wherein the stabilizers are hindered amines, organic phosphites, or hindered phenols.

15. The composition according to claim 1, wherein the composition further comprises an adhesion promoter.

16. The composition according to claim 13, wherein the composition further comprises an adhesion promoter.

17. The composition according to claim 15, wherein the adhesion promoter is an organosilane compound selected from 3-(trimethoxysilyl)propyl acrylate, methacryloxypropyltrimethoxysilane, tetraethoxysilane, allyltrimethoxysilane, vinyltrimethoxysilane, octyltriethoxysilane, methyltriethoxysilane, methyltrimethoxysilane, vinylmethyldimethoxysilane, β-(3, 4-epoxycyclohexyl)ethyltrimethoxysilane, and γ-glycidylpropyltrimethoxysilane.

18. The composition according to claim 16, wherein the adhesion promoter is an alkoxysilane compound selected from 3-(trimethoxysilyl)propyl acrylate, methacryloxypropyltrimethoxysilane, tetraethoxysilane, allyltrimethoxysilane, vinyltrimethoxysilane, vinyltriethoxysilane, octyltriethoxysilane, methyltriethoxysilane, methyltrimethoxysilane, vinylmethyldimethoxysilane, β-(3,4-epoxycyclohexyl) ethyltrimethoxysilane, and γ-glycidylpropyltrimethoxysilane.

19. A method of making a radiation curable composition comprising:
(I) forming a mixture comprising:
(A) an alkenyl ether-functional polyisobutylene polymer in which at least 50 mole percent of the non-terminal repeating units of the polymer are isobutylene units and containing at least one group having the formula

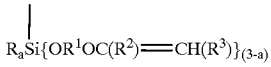

wherein R is independently selected from monovalent hydrocarbon groups and alkoxy groups, R¹ is a divalent hydrocarbon group having from 2 to 20 carbon atoms, R² and R³ are independently selected from a hydrogen atom and a monovalent hydrocarbon group, and a has a value of 0 to 2;
(B) a cationic photoinitiator; and
(C) a miscible reactive diluent selected from
(i) a difunctional vinyl ether reactive diluent selected from butanediol divinyl ether, pentanediol divinyl ether, hexanediol divinyl ether, heptanediol divinyl ether, cyclohexane dimethanol divinyl ether, ethylene glycol divinyl ether, diethylene glycol divinyl ether, triethylene glycol divinyl ether, neopentyl glycol divinyl ether, ethoxylated$_{2\text{-}20}$ bisphenol A divinyl ether, poly-THF divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl)cyclohexyl)methyl) succinate, bis((4-((ethenyloxy)methyl)cyclohexyl)methyl) adipate, and bis-((4-((ethenyloxy)methyl)cyclohexyl)methyl) glutarate or (ii) an acrylate reactive diluent with the formula $(R^8)X_b$ wherein $R^8$ is a non-silicon containing organic group, X is an organic group containing at-least one acrylate functional group, and b has a value of 2–4, (iii) a monofunctional vinyl ether reactive diluent selected from cyclohexyl vinyl ether, cyclohexanedimethanol monovinyl ether, hydroxybutyl vinyl ether, dodecyl vinyl ether, diethyleneglycol monovinyl ether, 2-ethylhexyl vinyl ether, octadecyl vinyl ether, and tetradecyl vinyl ether, and mixtures thereof, and (iv) an epoxy functional reactive diluent.

20. The method according to claim 19, wherein the mixture further comprises at least one ingredient selected from free radical photoinitiators, photosensitizers, long chain hydrocarbon diluents having ester, ether, anhydride, or carbonyl functional groups, and stabilizers.

21. The method according to claim 19, wherein the composition further comprises an adhesion promoter.

22. A method of making an article of manufacture comprising:

(I) applying a radiation curable composition comprising:
(A) an alkenyl ether-functional polyisobutylene polymer in which at least 50 mole percent of the non-terminal repeating units of the polymer are isobutylene units and containing at least one group having the formula

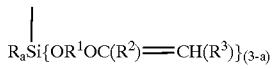

$R_a Si\{OR^1 OC(R^2)\!\!=\!\!CH(R^3)\}_{(3-a)}$ wherein R is independently selected from monovalent hydrocarbon groups and alkoxy groups, $R^1$ is a divalent hydrocarbon group having from 2 to 20 carbon atoms, $R^2$ and $R^3$ are independently selected from a hydrogen atom and a monovalent hydrocarbon group, and a has a value of 0 to 2;

(B) a cationic photoinitiator; and (C) a miscible reactive diluent selected from (i) a difunctional vinyl ether reactive diluent selected from butanediol divinyl ether, pentanediol divinyl ether, hexanediol divinyl ether, heptanediol divinyl ether, cyclohexane dimethanol divinyl ether, ethylene glycol divinyl ether, diethylene glycol divinyl ether, triethylene glycol divinyl ether, neopentyl glycol divinyl ether, ethoxylated$_{2\text{-}20}$ bisphenol A divinyl ether, poly-THF divinyl ether, bis-(4-ethenyloxy butyl)-succinate, bis-(4-ethenyloxy butyl)-adipate, bis-(4-ethenyloxy butyl)-glutarate, bis-((4-((ethenyloxy)methyl)cyclohexyl)methyl) succinate, bis((4-((ethenyloxy)methyl)cyclohexyl)methyl) adipate, and bis-((4-((ethenyloxy)methyl)cyclohexyl)methyl) glutarate or (ii) an acrylate reactive diluent with the formula $(R^8)X_b$ wherein $R^8$ is a non-silicon containing organic group, X is an organic group containing at-least one acrylate functional group, and b has a value of 2–4, (iii) a monofunctional vinyl ether reactive diluent selected from cyclohexyl vinyl ether, cyclohexanedimethanol monovinyl ether, hydroxybutyl vinyl ether, dodecyl vinyl ether, diethyleneglycol monovinyl ether, 2-ethylhexyl vinyl ether, octadecyl vinyl ether, and tetradecyl vinyl ether, and mixtures thereof, and (iv) an epoxy functional reactive diluent; and (II) exposing the coating to an energy source selected from (i) ultraviolet light and (ii) visible light in an amount sufficient to cure the coating.

23. The method according to claim 22, wherein the composition further comprises at least one ingredient selected from free radical photoinitiators, photosensitizers, long chain hydrocarbon diluents having epoxy, ester, ether, glycidyl ether, anhydride, or carbonyl functional groups, and stabilizers.

24. The method according to claim 22, wherein the composition further comprises an adhesion promoter.

* * * * *